United States Patent
Chintyan (10) Patent No.: US 7,180,444 B2
(45) Date of Patent: Feb. 20, 2007

(54) SYSTEM AND METHOD FOR DETERMINING A VELOCITY AND A DIRECTION OF TRAVEL OF A VEHICLE ON A ROADWAY

(75) Inventor: James R. Chintyan, Davison, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/154,005

(22) Filed: Jun. 16, 2005

(65) Prior Publication Data
US 2006/0284764 A1 Dec. 21, 2006

(51) Int. Cl.
G01C 21/00 (2006.01)
(52) U.S. Cl. ............... 342/357.07; 342/357.06; 342/357.08; 701/213
(58) Field of Classification Search ........... 342/357.06, 342/357.07, 357.08; 701/207, 209, 213, 701/119
See application file for complete search history.

(56) References Cited

U.S. PATENT DOCUMENTS 5,907,293 A * 5/1999 Tognazzini ............ 340/903
6,810,321 B1 10/2004 Cook ................... 701/117
2004/0227661 A1* 11/2004 Godsy ................. 342/70

* cited by examiner

Primary Examiner—Dao L. Phan
(74) Attorney, Agent, or Firm—Scott A. McBain (57) ABSTRACT

A system and a method for determining a velocity and a direction of travel of a vehicle on a roadway are provided. The method includes selecting a portion of the roadway and determining a cellular phone base station that is within a desired distance from the portion of the roadway, from a plurality of cellular phone base stations. The method further includes inducing a cellular phone base station to transmit a first message to a first global positioning system transceiver unit disposed in a first vehicle. The first message requests a first position coordinate from the first GPS transceiver unit. The method further includes receiving a second message from the first GPS transceiver unit having the first position coordinate and a first time value, and inducing the cellular phone base station to transmit a third message to the first GPS transceiver unit. The third message requests a second position coordinate of the first GPS transceiver unit. The method further includes receiving a fourth message from the first GPS transceiver unit having the second position coordinate and a second time value, and determining a velocity and a direction of travel of the first vehicle based on the first and second position coordinates and the first and second time values.

17 Claims, 8 Drawing Sheets

| ROADWAY NAME | LATITUDE VALUE | LONGITUDE VALUE |
|---|---|---|
| DELPHI DRIVE | X1 | Y1 |
| DELPHI DRIVE | X2 | Y1 |
| DELPHI DRIVE | X3 | Y1 |

FIG. 4

| CELLULAR PHONE BASE STATION ID | LATITUDE VALUE | LONGITUDE VALUE |
|---|---|---|
| 001 | X1 | Y2 |
| 002 | X2 | Y2 |

FIG. 5

| TRANSCEIVER ID | LATITUDE VALUE | LONGITUDE VALUE | TIME STAMP VALVE |
|---|---|---|---|
| 0001 | X1 | Y1 | 12:00:00 |

FIG. 6

| TRANSCEIVER ID | LATITUDE VALUE | LONGITUDE VALUE | TIME STAMP VALVE |
|---|---|---|---|
| 0001 | X2 | Y1 | 12:00:30 |

FIG. 7

| TRANSCEIVER ID | LATITUDE VALUE | LONGITUDE VALUE | TIME STAMP VALVE |
|---|---|---|---|
| 0002 | X3 | Y1 | 12:00:15 |

FIG. 8

| TRANSCEIVER ID | LATITUDE VALUE | LONGITUDE VALUE | TIME STAMP VALVE |
|---|---|---|---|
| 0002 | X4 | Y1 | 12:00:45 |

SYSTEM AND METHOD FOR DETERMINING A VELOCITY AND A DIRECTION OF TRAVEL OF A VEHICLE ON A ROADWAY

TECHNICAL FIELD

This application relates to a system and a method for determining a velocity and a direction of a vehicle on a roadway.

BACKGROUND

Vehicle traffic monitoring systems have been developed that utilize stationary sensors disposed at roadway intersections to monitor vehicle traffic. Many cities, however, have not implemented, the vehicle traffic monitoring systems having the stationary sensors. Thus, traffic information, such as a vehicle speed and a direction of travel on a predetermined portion of a roadway, cannot be remotely obtained.

Accordingly, there is a need for a system and a method for remotely determining a velocity and a direction of travel of a vehicle on a predetermined roadway.

SUMMARY

A method for determining a velocity and a direction of travel of a vehicle on a roadway in accordance with an exemplary embodiment is provided. The method includes selecting a portion of the roadway. The method further includes determining a cellular phone base station that is within a desired distance from the portion of the roadway, from a plurality of cellular phone base stations. The method further includes inducing a cellular phone base station to transmit a first message to a first global positioning system ("GPS") transceiver unit disposed in a first vehicle. The first vehicle is disposed on the portion of the roadway. The first message requests a first position coordinate from the first GPS transceiver unit. The method further includes receiving a second message from the first GPS transceiver unit having the first position coordinate and a first time value. The method further includes inducing the cellular phone base station to transmit a third message to the first GPS transceiver unit. The third message requests a second position coordinate of the first GPS transceiver unit. The method further includes receiving a fourth message from the first GPS transceiver unit having the second position coordinate and a second time value. The method further includes determining a velocity and a direction of travel of the first vehicle based on the first and second position coordinates and the first and second time values.

A system for determining a velocity and a direction of travel of a vehicle on a roadway in accordance with another exemplary embodiment is provided. The system includes a first computer configured to allow an operator to select a portion of the roadway and to determine a cellular phone base station that is within a desired distance from the portion of the roadway, from a plurality of cellular phone base stations. The system further includes a cellular service provider computer operably communicating with the first computer. The cellular service provider computer is configured to induce the cellular phone base station to transmit a first message to a first GPS transceiver unit disposed in a first vehicle. The first vehicle is disposed on the portion of the roadway. The first message requests a first position coordinate from the first GPS transceiver unit. The cellular phone base station is further configured to receive a second message from the first GPS transceiver unit having the first position coordinate and a first time value. The cellular service provider computer is further configured to induce the cellular phone base station to transmit a third message to the first GPS transceiver unit. The third message requests a second position coordinate from the first GPS transceiver unit. The cellular phone base station is further configured to receive a fourth message from the first GPS transceiver unit having the second position coordinate and a second time value. The cellular phone base station is further configured to communicate the first and second position coordinates and the first and second time values through the cellular service provider computer to the first computer. The first computer is further configured to determine a velocity and a direction of travel of the first vehicle based on the first and second position coordinates and the first and second time values.

An article of manufacture in accordance with another exemplary embodiment is provided. The article of manufacture includes a computer storage medium having a computer program encoded therein for determining a velocity and a direction of travel of a vehicle on a roadway. The computer storage medium includes code for selecting a portion of the roadway. The computer storage medium further includes code for determining a cellular phone base station that is within a desired distance from the portion of the roadway, from a plurality of cellular phone base stations. The computer storage medium further includes code for inducing the cellular phone base station to transmit a first message to a first GPS transceiver unit disposed in a first vehicle. The first vehicle is disposed on the portion of the roadway. The first message requests a first position coordinate from the first GPS transceiver unit. The computer storage medium further includes code for receiving a second message from the first GPS transceiver unit having the first position coordinate and a first time value. The computer storage medium further includes code for inducing a cellular phone base station to transmit a third message to the first GPS transceiver unit. The third message requests a second position coordinate of the first GPS transceiver unit. The computer storage medium further includes code for receiving a fourth message from the first GPS transceiver unit having the second position coordinate and a second time value. The computer storage medium further includes code for determining a velocity and a direction of travel of the first vehicle based on the first and second position coordinates and the first and second time values.

A method for selecting a desired roadway in accordance with another exemplary embodiment is provided. The method includes determining a first cellular phone base station that is within a desired distance from the first roadway, from a plurality of cellular phone base stations. The method further includes determining a first average velocity and direction of at least a first vehicle on a first roadway by querying a first GPS transceiver unit in the first vehicle for GPS coordinates of the first vehicle, utilizing the first cellular phone base station. The method further includes determining a second average velocity and direction of at least a second vehicle on a second roadway by querying a second GPS transceiver unit in the second vehicle for GPS coordinates of the second vehicle, utilizing either the first cellular phone base station or a second cellular phone base station. The method further includes indicating the first roadway is the desired roadway when the first average velocity is greater than the second average velocity.

DESCRIPTION OF EXEMPLARY EMBODIMENTS

Figure 1:
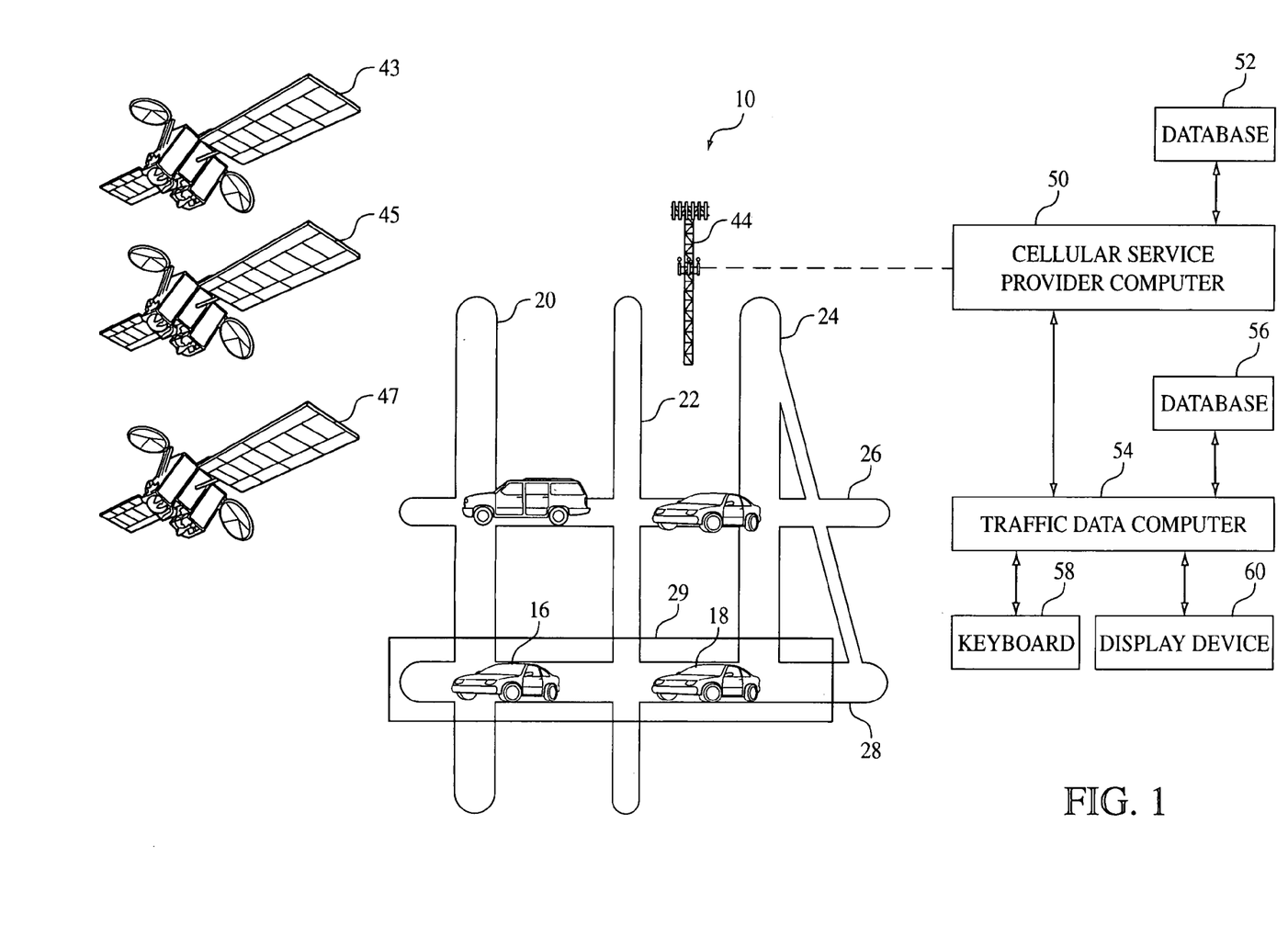
FIG. 1 is a block diagram of a system for determining a velocity and a direction of travel of one or more vehicles on a portion of a roadway.

Referring to FIG. 1, a vehicle monitoring system 10 for determining a speed and a direction of travel of one or more vehicles on one or more roadways is provided. In particular, the vehicle monitoring system 10 is utilized to determine speed and direction of travel of vehicles 16, 18 having GPS transceiver units, on one or more of the roadways 20, 22, 24, 26, 28. The vehicle monitoring system 10 includes a GPS transceiver unit 40, a GPS transceiver unit 42, GPS satellites 43, 45, 47, a cellular phone base station 44, a cellular service provider computer 50, a database 52, a traffic data computer 54, a database 56, a keyboard 58, and a display device 60.

Figure 2:
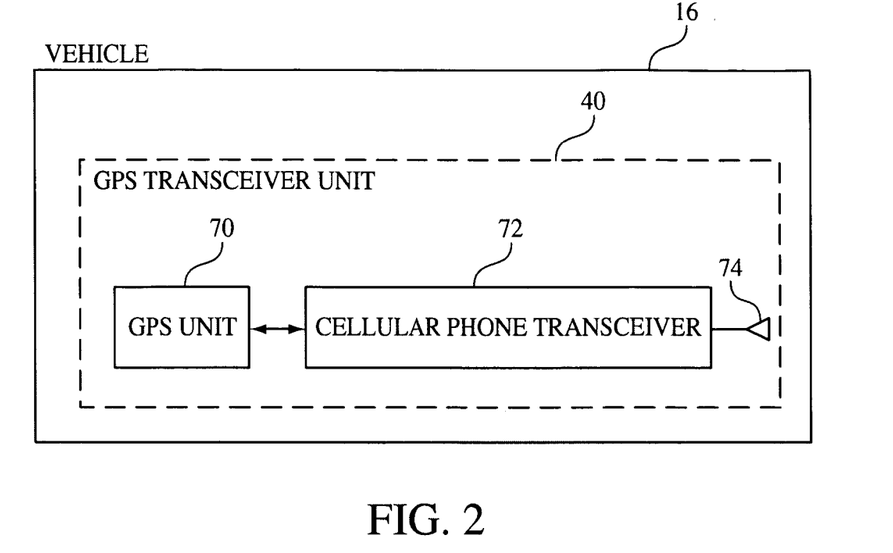
FIG. 2 is a block diagram of a first vehicle having a first GPS transceiver unit.

Referring to FIGS. 1 and 2, the GPS transceiver unit 40 is provided to determine a GPS position of the vehicle 16 and to transmit position coordinates associated with the vehicle 16 to the cellular phone base station 44. The GPS transceiver unit 40 is disposed within the vehicle 16 and includes a GPS unit 70, a transceiver 72, and an antenna 74. The GPS unit 70 is provided to receive GPS signals from at least the satellites 43, 45, 47 to determine a position coordinate and a timestamp value of the vehicle 16. The position coordinate includes a latitude value and a longitude value. The GPS unit 70 is operably coupled to the cellular phone transceiver 72. The transceiver 72 is configured to transmit an RF signal having the position coordinate and a timestamp value, via the antenna 74, to the cellular phone base station 44. For example, the cellular phone transceiver 72 can transmit an RF signal including a message 110 having: (i) a transceiver ID "0001", (ii) a latitude value "X1", (iii) a longitude value "Y1", and (iv) a timestamp value "12:00:00."

Figure 3:
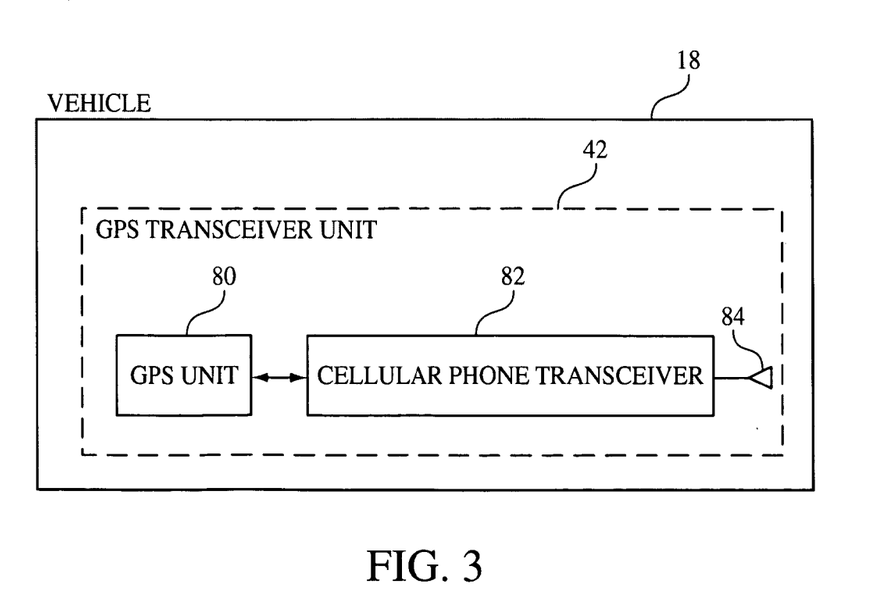
FIG. 3 is a block diagram of a second vehicle having a second GPS transceiver unit.

Referring to FIGS. 1 and 3, the GPS transceiver unit 42 is provided to determine a GPS position of the vehicle 18 and to transmit position coordinates associated with the vehicle 18 to the cellular phone base station 44. The GPS transceiver unit 42 is disposed within the vehicle 18 and includes a GPS unit 80, a cellular phone transceiver 82, and an antenna 84. The GPS unit 80 is provided to receive GPS signals from at least the satellites 43, 45, 47 to determine a position coordinate of the vehicle 18. The position coordinate includes a latitude value and a longitude value. The GPS unit 80 is operably coupled to the cellular phone transceiver 82. The cellular phone transceiver 82 is configured to transmit an RF signal having the position coordinate and a time stamp value, via the antenna 84, to the cellular phone base station 44. For example, the cellular phone transceiver 82 can transmit a radio frequency (RF) signal including a message 114 having: (i) a transceiver ID "0002", (ii) a latitude value "X3", (iii) a longitude value "Y1", and (iv) a time stamp value "12:00:15."

The cellular phone base station 44 is provided to transmit RF signals to the GPS transceiver units 40, 42 requesting position coordinates and to receive RF signals from the GPS transceiver units 40, 42 having messages including the position coordinates of the vehicles 16, 18 respectively. The cellular phone base station 44 is further configured to send the messages received from the GPS transceiver units 40, 42 to the cellular service provider computer 50.

Figure 5:
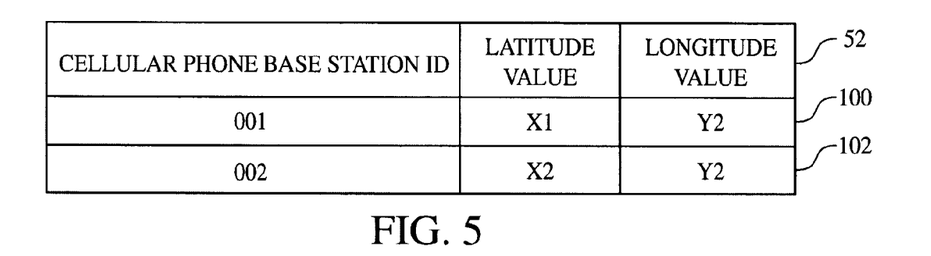
FIG. 5 is a block diagram of a second or database utilized by a cellular service provider computer shown in FIG. 1.

The cellular service provider computer 50 is provided to receive messages having position coordinates, associated with the GPS transceiver units 40, 42, from the cellular phone base station 44. The computer 50 is further provided to access the database 52 to determine cellular phone base stations within a predetermined distance from a selected roadway based on the position of the cellular phone base station. In particular, the database 52 includes a plurality of records each having the following fields: (i) a cellular phone base station ID and, a (ii) latitude value, and (iii) a longitude value. The cellular phone base station ID is a unique ID associated with a particular cellular phone base station, and the latitude value and a longitude value indicate a position coordinate of the cellular phone base station. The cellular service provider computer 50 further operably communicates with the traffic data computer 54.

The traffic data computer 54 is provided to allow an operator to select a portion 29 of a roadway using the keyboard 58, and to display the selected portion on the display device 60. In response to the selection of the roadway portion 29, the computer 54 accesses the database 56 to obtain a plurality of position coordinates associated with a selected portion 29 of the roadway 28. Further, the computer 54 configured to transmit a message to the cellular service provider computer 50 indicating the selected portion 29. Further, the computer 54 is configured to calculate a velocity of vehicles equipped with GPS transceiver units that are disposed on the selected portion 29 based upon position coordinates associated with the vehicles, as will be explained in greater detail below.

Referring to FIGS. 6–10, a method for determining a velocity of vehicles on a selected portion of a roadway will now be explained. The method is implemented utilizing the vehicle monitoring system 10.

Figure 10:
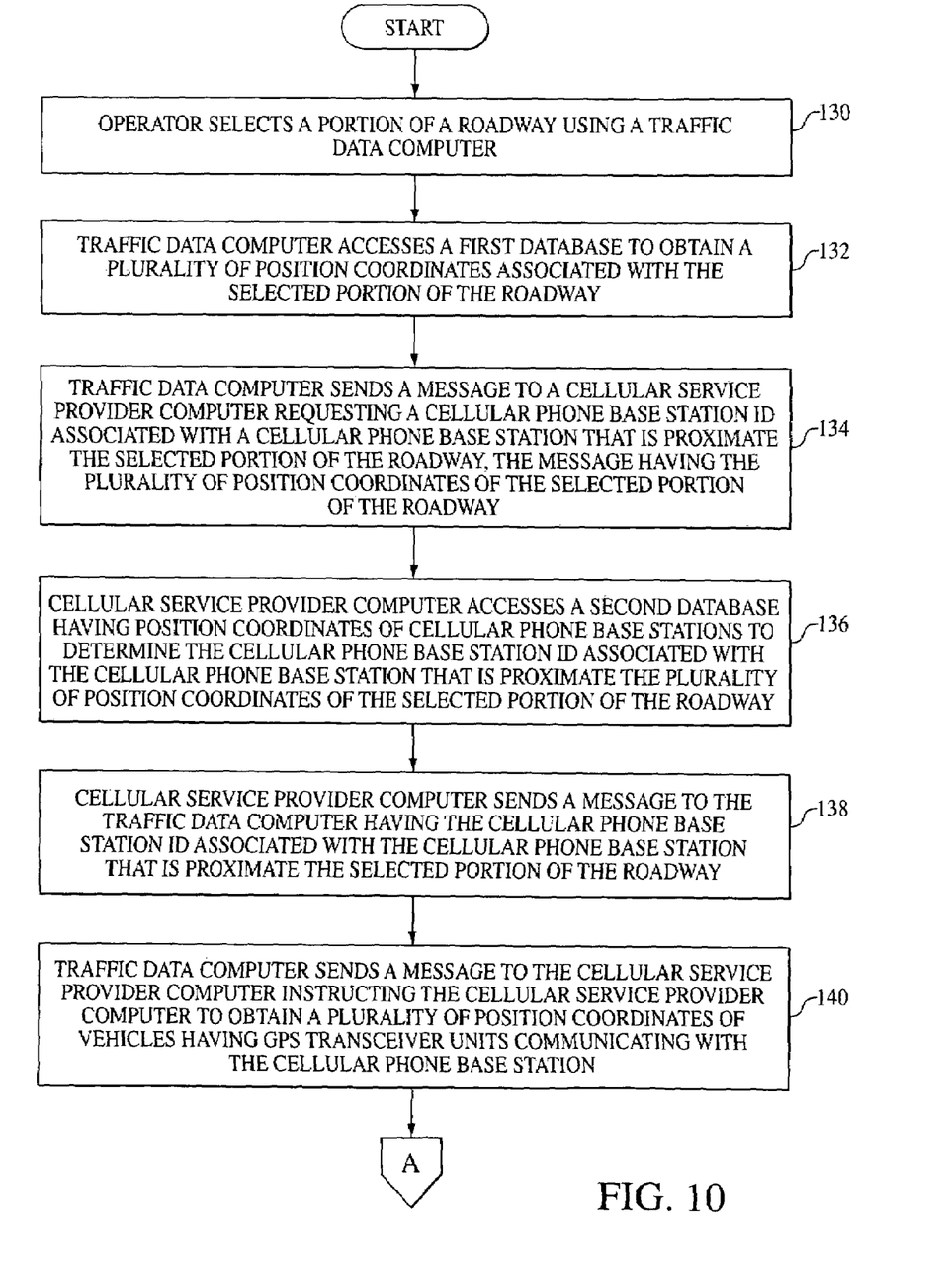
FIGS. 10–13 are flowcharts of a method for determining a velocity and a direction of travel of one or more vehicles on a portion of a roadway.

At step 130, an operator selects the portion 29 of the roadway 28 using the traffic data computer 54. In particular, the operator selects the portion 29 of the roadway 28 using the keyboard 58 operably coupled to the computer 54.

Figure 4:
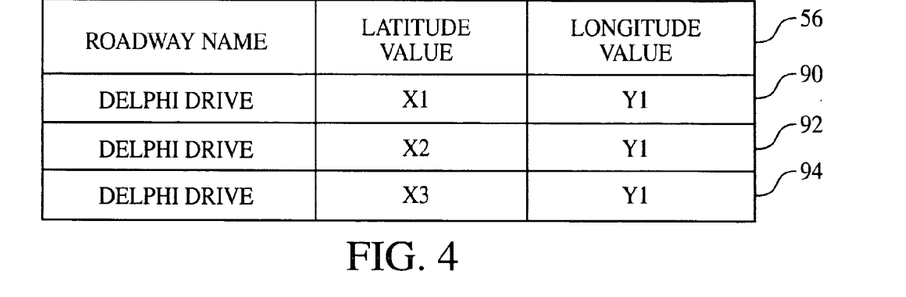
FIG. 4 is a block diagram of a first database utilized by a traffic data computer shown in FIG. 1.

At step 132, the traffic data computer 54 accesses the database 56 to obtain a plurality of position coordinates associated with the selected portion 29 of the roadway 28. For example, referring to FIG. 4, the computer 54 accesses the database 56 to obtain in the position coordinate pairs "X1, Y1", "X2, Y1", and "X3, Y1" when a portion of the roadway "Delphi Drive" is selected by an operator.

At step 134, the traffic data computer 54 sends a message to the cellular service provider computer 50 requesting a cellular phone base station ID associated with a cellular phone base station that is proximate the selected portion 29 of the roadway 28. The message includes the plurality of position coordinates of the selected portion 29 of the roadway 28.

At step 136, the cellular service provider computer 50 accesses the database 52 having position coordinates of cellular phone base stations to determine the cellular phone base station ID associated with the cellular phone base station that is proximate the plurality of position coordinates of the selected portion 29 of the roadway 28. For example, the computer 50 can access the database 52 to determine the cellular phone base station ID "001" associated with the cellular phone base station 44 that is proximate the selected portion of the roadway 28.

At step 138, the cellular service provider computer 50 sends a message to the traffic data computer 54 having the cellular phone base station ID "001" associated with the cellular phone base station 44 that is proximate the selected portion 29 of the roadway 28.

At step 140, the traffic data computer 54 sends a message to the cellular service provider computer 50 instructing the computer 50 to obtain a plurality of position coordinates of vehicles having GPS transceiver units communicating with the cellular phone base station 44.

Figure 11:
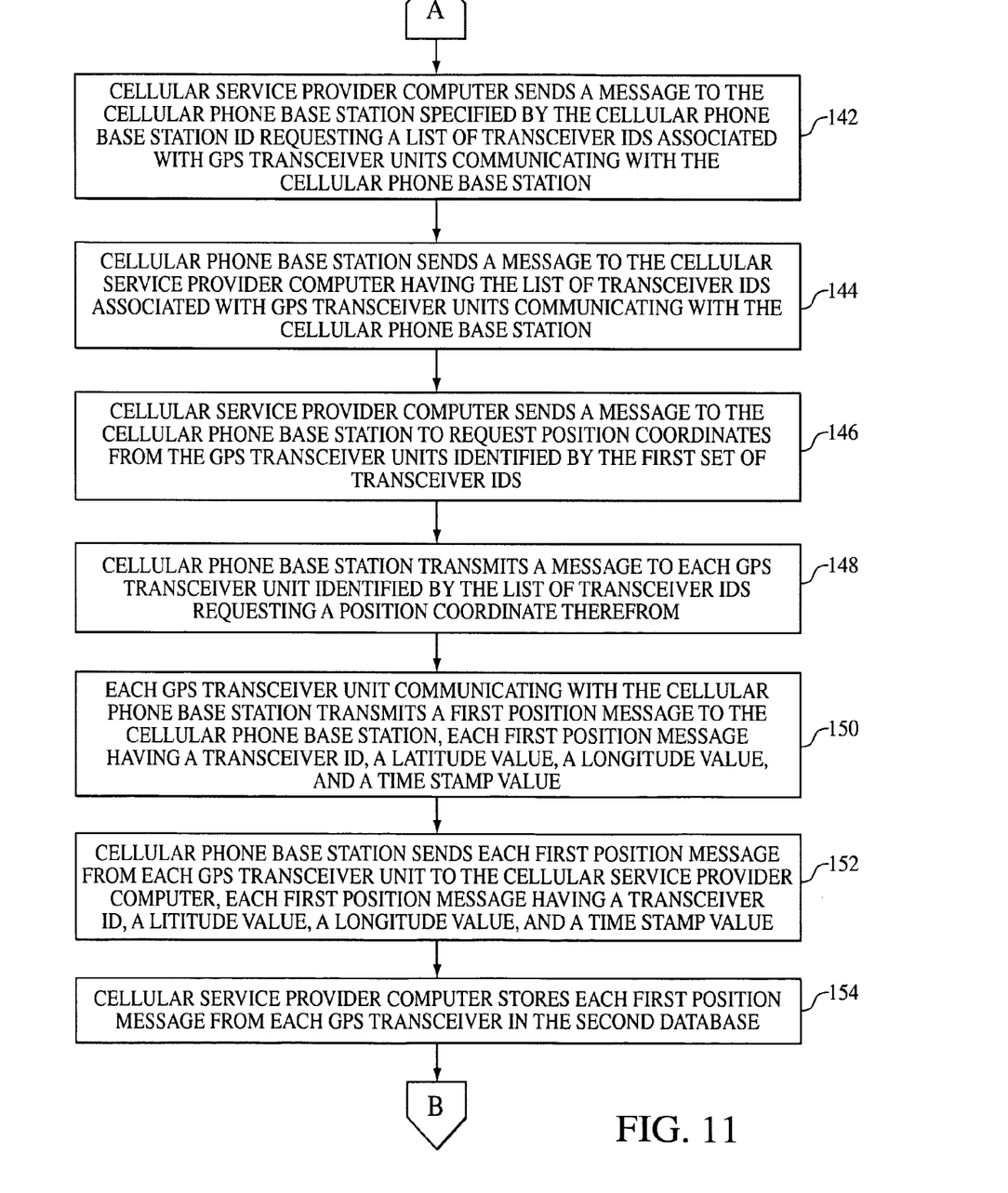

At step 142, the cellular service provider computer 50 sends a message to the cellular phone base station 44 specified by the cellular phone base station ID "001" requesting a list of transceiver IDs associated with GPS transceiver units communicating with the cellular phone base station 44.

At step 144, the cellular phone base station 44 sends a message to the cellular service provider computer 50 having the list of transceiver IDs associated with GPS transceiver units communicating with the cellular phone base station 44. For example, the station 44 sends a message to the computer 50 having the transceiver IDs "0001" and "0002" associated with GPS transceiver units 40, 42, respectively, communicating with the station 44.

At step 146, the cellular service provider computer 50 sends a message to the cellular phone base station 44 instructing the cellular phone base station 44 to request position coordinates from the GPS transceiver units identified by the list of transceiver IDs.

At step 148, the cellular phone base station 44 transmits a message to each GPS transceiver unit identified by the list of transceiver IDs requesting a position coordinate therefrom.

Figure 6:
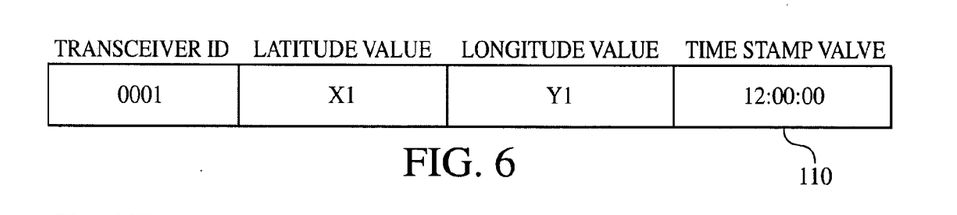
FIGS. 6 and 7 are schematics of first and second messages transmitted by a first GPS transceiver unit at first and second times, respectively.
Figure 8:
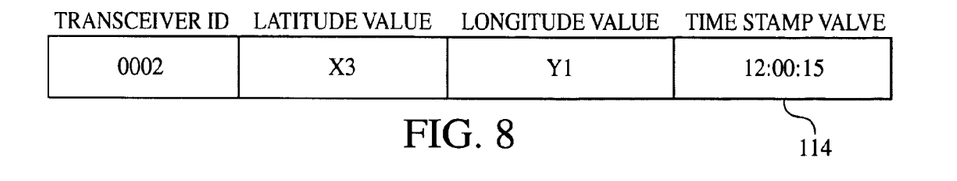
FIGS. 8 and 9 are schematics of first and second messages transmitted by a first GPS transceiver unit at third and fourth times, respectively.

At step 150, each GPS transceiver unit communicating with the cellular phone base station 44 transmits a first position message to the cellular phone base station 44. For example, the GPS transceiver unit 40 transmits a position message 110 to the cellular phone base station 44, and the GPS transceiver unit 42 transmits a position message 114 to the cellular phone base station 44. Each position message has a transceiver ID, a latitude value, a longitude value, and a time stamp value.

At step 152, the cellular phone base station 44 sends each first position message from each GPS transceiver unit to the cellular service provider computer 50. For example, the cellular phone base station 44 sends the messages 110, 114 to the computer 50.

Figure 12:
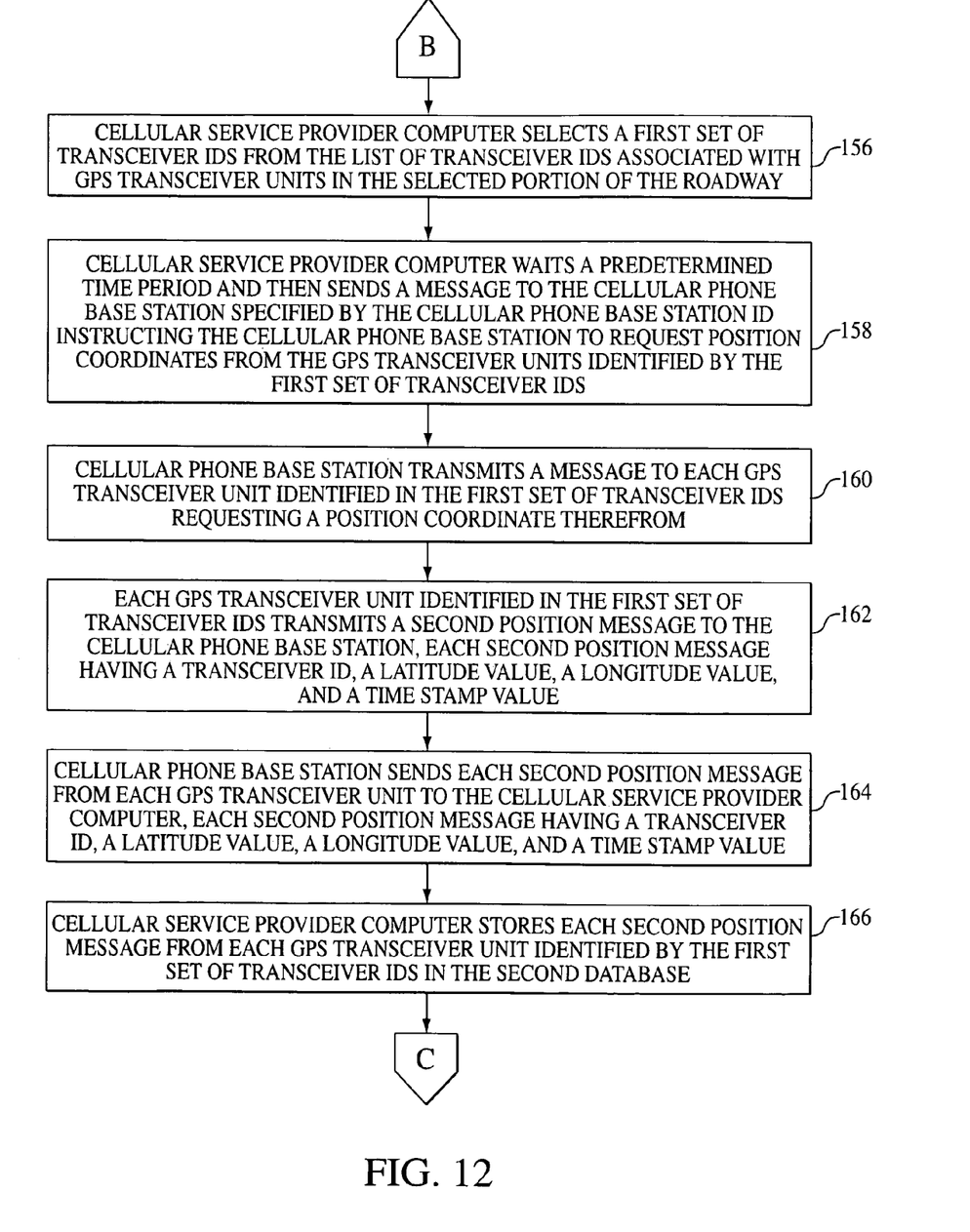

At step 154, the cellular service provider computer 50 stores each first position message from each GPS transceiver in the database 52. For example, the computer 50 stores the position messages 110, 114 from the GPS transceivers 40, 42, respectively in the database 52.

At step 156, the cellular service provider computer 50 selects a first set of transceiver IDs from the list of transceiver IDs associated with GPS transceivers in the selected portion 29 of the roadway 28. For example, the computer 50 selects the transceiver IDs "0001" and "0002" associated with the GPS transceiver units 40, 42, respectively, in the selected portion 29 of the roadway 28.

At step 158, the cellular service provider computer 50 waits a predetermined time period and then sends a message to the cellular phone base station 44 specified by the cellular phone base station ID instructing the station 44 to request position coordinates from the GPS transceiver units identified by the first set of transceiver IDs. For example, the computer 50 waits a predetermined time period and then sends a message to the station 44 instructing the station 44 to request position coordinates from GPS transceiver units 40, 42 identified by the transceiver IDs "0001", "0002", respectively.

At step 160, the cellular phone base station 44 transmits a message to each GPS transceiver unit identified in the first set of transceiver IDs requesting a position coordinate therefrom. For example, the station 44 transmits a message to the GPS transceiver units 40, 42 requesting position coordinates therefrom.

Figure 7:
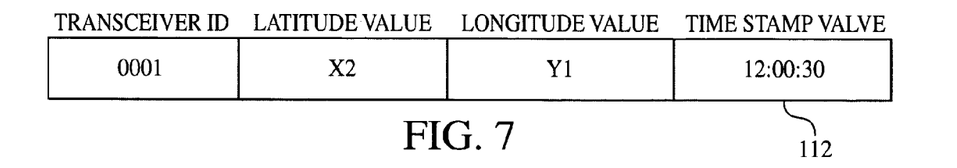
Figure 9:
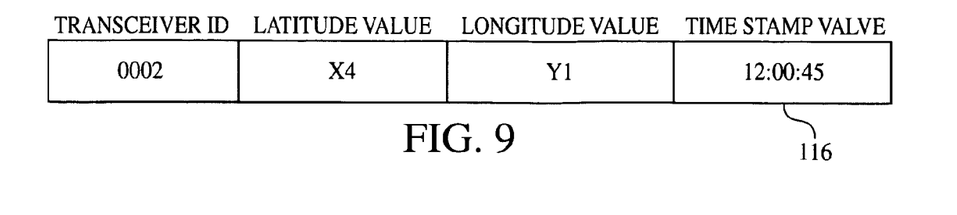

At step 162, each GPS transceiver unit identified in the first set of transceiver IDs transmits a second position message to the cellular phone base station 44. For example, the GPS transceiver units 40, 42 transmit the position messages 112, 116, respectively, to the station 44.

Figure 13:
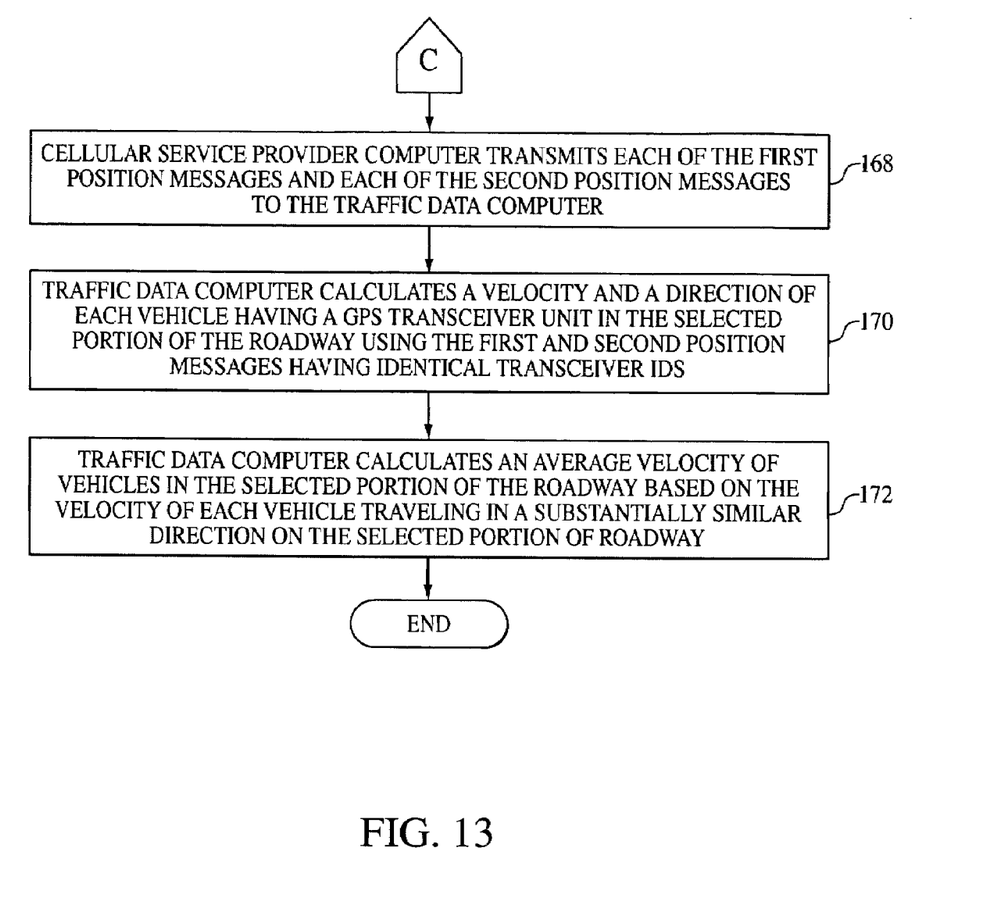

At step 164, the cellular phone base station 44 sends each second position message from each GPS transceiver unit to the cellular service provider computer 50. For example, the station 44 transmits the position messages 112, 116, respectively, to the computer 50.

At step 166, the cellular service provider computer 50 stores each second position message from each GPS transceiver unit identified by the first set of transceiver IDs in the database 52. For example, the computer 50 stores the position messages 112, 116 in the database 52.

At step 168, the cellular service provider computer 50 transmits each of the first position messages and each of the second position messages to the traffic data computer 54. For example, the computer 50 transmits the position messages 110, 114 and 112, 116 to the computer 54.

At step 170, the traffic data computer 54 calculates a velocity and a direction of each vehicle having a GPS transceiver unit in the selected portion of the roadway using the first and second position messages having identical transceiver IDs. For example, the computer 54 calculates a velocity and a direction of the vehicle 16 using the position messages 110, 114 having the transceiver IDs "0001." Further, for example, computer 54 calculates the a velocity and a direction of the vehicle 18 using the position messages 112, 116 having the transceiver IDs "0002."

At step 172, the traffic data computer 54 calculates an average velocity of vehicles in the selected portion 29 of the roadway 28 based on the velocity of each vehicle traveling in a substantially similar direction on the selected portion of roadway. For example, the computer 54 calculates average velocity of the vehicles 16, 18 in the selected portion of the roadway 28 based on a velocity of each of the vehicles 16, 18 traveling in a substantially similar direction (leftwardly in FIG. 1) on the roadway 28. After step 172, the method is exited.

Figure 14:
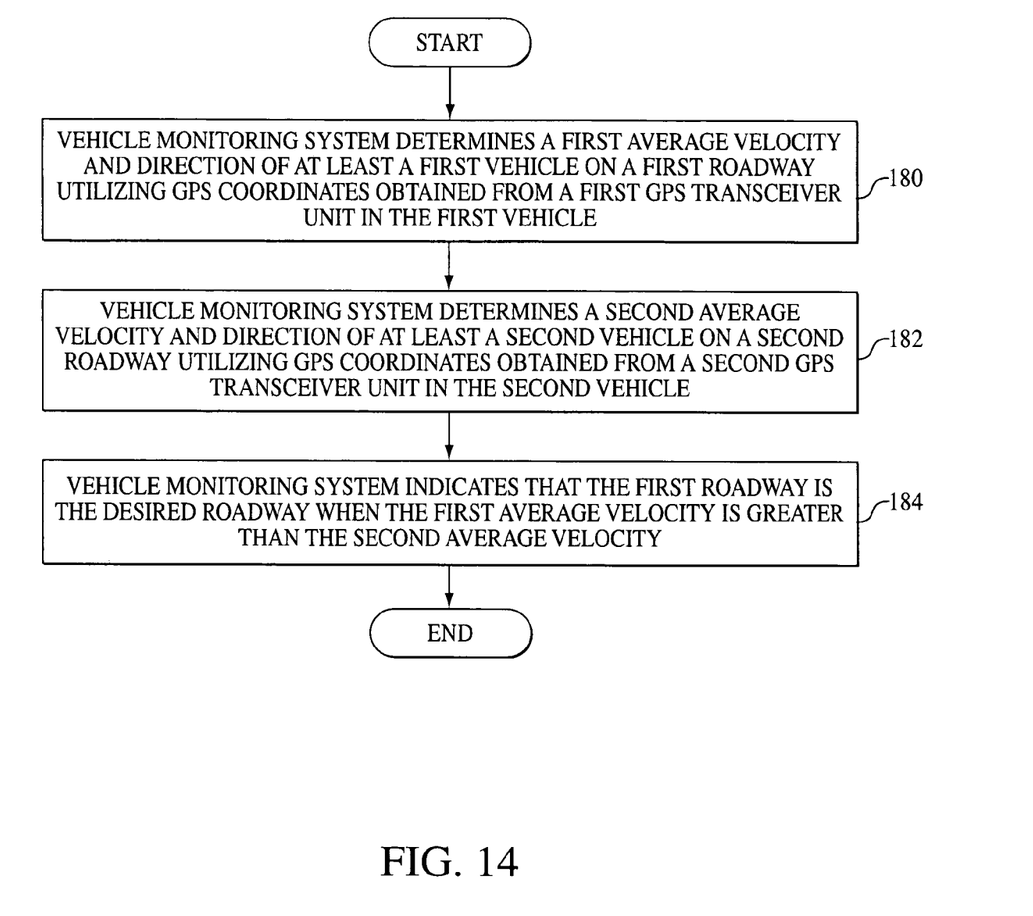
FIG. 14 is a flowchart of a method for selecting a desired roadway.

Referring to FIG. 14, a method for selecting a desired roadway utilizing the vehicle monitoring system 10 in accordance with another exemplary embodiment will be explained. The method determines a first cellular phone base station that is within a desired distance from the first roadway, from a plurality of cellular phone base stations.

Next at step 180, the vehicle monitoring system 10 determines a first average velocity and direction of at least a first vehicle on a first roadway, using GPS coordinates obtained from a GPS transceiver unit in the first vehicle by the cellular phone base station.

Next at step 182, the vehicle monitoring system 10 determines a second average velocity and direction of at least a second vehicle on a second roadway, using GPS coordinates obtained from a second GPS transceiver unit in the second vehicle by the cellular phone base station.

Next at step 184, the vehicle monitoring system 10 indicates that the first roadway is the desired roadway when the first average velocity is greater than the second average velocity. After step 184, the method is exited.

The vehicle monitoring system and method for determining a velocity and a direction of travel of one or more vehicles on a portion of a roadway provide a substantial advantage over other systems. In particular, the vehicle monitoring system and method provide a technical effect of selecting a portion of a roadway and determining a cellular phone base station proximate the roadway, from a plurality of cellular phone base stations. Thereafter, the cellular phone base station communicates with GPS transceiver units in vehicles on the roadway for remotely determining a velocity and direction of one or more vehicles on the portion of a roadway. Thus, the vehicle monitoring system allows a user to query vehicles on a selected portion of a roadway using a specific cellular phone base station, for obtaining desired position coordinate data from the vehicles on the selected portion of the roadway.

As described above, the present invention can be embodied in the form of computer-implemented processes and apparatuses for practicing those processes. In an exemplary embodiment, the invention is embodied in computer program code executed by one or more elements. The present invention may be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for determining a velocity and a direction of travel of a vehicle on a roadway, comprising:
   selecting a portion of the roadway;
   determining a cellular phone base station that is within a desired distance from the portion of the roadway, from a plurality of cellular phone base stations;
   inducing the cellular phone base station to transmit a first message to a first GPS transceiver unit disposed in a first vehicle, the first vehicle being disposed on the portion of the roadway, the first message requesting a first position coordinate from the first GPS transceiver unit;
   receiving a second message from the first GPS transceiver unit having the first position coordinate and a first time value;
   inducing the cellular phone base station to transmit a third message to the first GPS transceiver unit, the third message requesting a second position coordinate of the first GPS transceiver unit;
   receiving a fourth message from the first GPS transceiver unit having the second position coordinate and a second time value; and
   determining a velocity and a direction of travel of the first vehicle based on the first and second position coordinates and the first and second time values.

2. The method of claim 1, wherein the step of determining the cellular phone base station that is within the desired distance from the portion of the roadway, from a plurality of cellular phone base stations, comprises:
   accessing a first database to obtain a first plurality of position coordinates associated with the portion of the roadway;
   accessing a second database to obtain a second plurality of position coordinates associated with the plurality of cellular phone base stations; and
   determining the cellular phone base station that is within the desired distance from the portion of the roadway based on the first plurality of position coordinates and the second plurality of position coordinates.

3. The method of claim 1, further comprising determining whether the vehicle associated with the first GPS transceiver unit is on the selected portion of the roadway based on the first position coordinate.

4. The method of claim 1, wherein the first position coordinate comprises a latitude value and a longitude value.

5. The method of claim 1, further comprising:
   inducing the cellular phone base station to transmit a fifth message to a second GPS transceiver unit disposed in a second vehicle, the second vehicle being disposed on the portion of the roadway, the fifth message requesting a third position coordinate from the second GPS transceiver unit;
   receiving a sixth message from the second GPS transceiver unit having the third position coordinate and a third time value;
   inducing the cellular phone base station to transmit a seventh message to the second GPS transceiver unit, the seventh message requesting a fourth position coordinate from the second GPS transceiver unit;

receiving an eighth message from the second GPS transceiver unit having the fourth position coordinate and a fourth time value; and determining a velocity and a direction of travel of the second vehicle based on the third and fourth position coordinates and the third and fourth time values.

6. The method of claim 5, further comprising determining an average velocity of the first and second vehicles on the roadway based on the velocity of the first vehicle and the velocity of the second vehicle.

7. A system for determining a velocity and a direction of travel of a vehicle on a roadway, comprising:

a first computer configured to allow an operator to select a portion of the roadway and to determine a cellular phone base station that is within a desired distance from the portion of the roadway, from a plurality of cellular phone base stations; and a cellular service provider computer operably communicating with the first computer, the cellular service provider computer configured to induce the cellular phone base station to transmit a first message to a first GPS transceiver unit disposed in a first vehicle, the first vehicle being disposed on the portion of the roadway, the first message requesting a first position coordinate from the first GPS transceiver unit, the cellular phone base station further configured to receive a second message from the first GPS transceiver unit having the first position coordinate and a first time value, the cellular service provider computer further configured to induce the cellular phone base station to transmit a third message to the first GPS transceiver unit, the third message requesting a second position coordinate from the first GPS transceiver unit, the cellular phone base station further configured to receive a fourth message from the first GPS transceiver unit having the second position coordinate and a second time value, the cellular phone base station further configured to communicate the first and second position coordinates and the first and second time values through the cellular service provider computer to the first computer, the first computer further configured to determine a velocity and a direction of travel of the first vehicle based on the first and second position coordinates and the first and second time values.

8. The system of claim 7, wherein the first computer is further configured to communicate with a first database to obtain a first plurality of position coordinates associated with the portion of the roadway, the cellular service provider computer is further configured to access a second database to obtain a second plurality of position coordinates associated with the plurality of cellular phone base stations, the first computer further configured to determine the cellular phone base station that is within the desired distance from the portion of the roadway based on the first plurality of position coordinates and the second plurality of position coordinates.

9. The system of claim 7, wherein the first computer is further configured to determine whether the first vehicle associated with the first GPS transceiver unit is on the selected portion of the roadway based on the first position coordinate.

10. The system of claim 7, wherein the first position coordinate comprises a latitude value and a longitude value.

11. The system of claim 7, wherein the cellular service provider computer is further configured to induce the cellular phone base station to transmit a fifth message to a second GPS transceiver unit disposed in a second vehicle, the second vehicle being disposed on the portion of the roadway, the fifth message requesting a third position coordinate from the second GPS transceiver unit, the cellular phone base station further configured to receive a sixth message from the second GPS transceiver unit having the third position coordinate and a third time value, the cellular service provider computer further configured to induce the cellular phone base station to transmit a seventh message to the second GPS transceiver unit, the seventh message requesting a fourth position coordinate of the second GPS transceiver unit, the cellular phone base station further configured to receive an eighth message from the second GPS transceiver unit having the fourth position coordinate and a fourth time value, the cellular phone base station configured to communicate the third and fourth position coordinates and the third and fourth time values through the cellular service provider computer to the first computer, the first computer further configured to determine a velocity and a direction of travel of the second vehicle based on the third and fourth position coordinates and the third and fourth time values.

12. The system of claim 11, wherein the first computer is further configured to determine an average velocity and a direction of travel of the first and second vehicles on the roadway based on the velocity of the first vehicle and the velocity of the second vehicle.

13. An article of manufacture, comprising:

a computer storage medium having a computer program encoded therein for determining a velocity and a direction of travel of a vehicle on a roadway, the computer storage medium comprising:

code for selecting a portion of the roadway;

code for determining a cellular phone base station that is within a desired distance from the portion of the roadway, from a plurality of cellular phone base stations;

code for inducing the cellular phone base station to transmit a first message to a first GPS transceiver unit disposed in a first vehicle, the first vehicle being disposed on the portion of the roadway, the first message requesting a first position coordinate from the first GPS transceiver unit;

code for receiving a second message from the first GPS transceiver unit having the first position coordinate and a first time value;

code for inducing the cellular phone base station to transmit a third message to the first GPS transceiver unit, the third message requesting a second position coordinate of the first GPS transceiver unit;

code for receiving a fourth message from the first GPS transceiver unit having the second position coordinate and a second time value; and code for determining a velocity and a direction of travel of the first vehicle based on the first and second position coordinates and the first and second time values.

14. The article of manufacture of claim 13, further comprising code for determining whether the vehicle associated with the first GPS transceiver unit is on the selected portion of the roadway based on the first position coordinate.

15. The article of manufacture of claim 13, wherein the first position coordinate comprises a latitude value and a longitude value.

16. The article of manufacture of claim 13, further comprising:
  code for inducing a cellular phone base station to transmit a fifth message to a second GPS transceiver unit disposed in a second vehicle, the second vehicle being disposed on the portion of the roadway, the fifth message requesting a third position coordinate from the second GPS transceiver unit;
  code for receiving a sixth message from the second GPS transceiver unit having the third position coordinate and a third time value;
  code for inducing the cellular phone base station to transmit a seventh message to the second GPS transceiver unit, the seventh message requesting a fourth position coordinate from the second GPS transceiver unit;
  code for receiving an eighth message from the second GPS transceiver unit having the fourth position coordinate and a fourth time value; and
  code for determining a velocity and a direction of travel of the second vehicle based on the third and fourth position coordinates and the third and fourth time values.

17. The article of manufacture of claim 16, further comprising code for determining an average velocity of the first and second vehicles on the roadway based on the velocity of the first vehicle and the velocity of the second vehicle.

* * * * *